(12) United States Patent
Kajiwara et al.

(10) Patent No.: US 6,744,163 B2
(45) Date of Patent: Jun. 1, 2004

(54) VIBRATION TYPE BRUSHLESS MOTOR

(75) Inventors: Hidetoshi Kajiwara, Shizuoka-ken (JP); Hiroshi Iwai, Shizuoka-ken (JP)

(73) Assignee: Victor Company of Japan, Ltd. (JP)

( * ) Notice: Subject to any disclaimer, the term of this patent is extended or adjusted under 35 U.S.C. 154(b) by 105 days.

(21) Appl. No.: 10/053,879

(22) Filed: Jan. 24, 2002

(65) Prior Publication Data

US 2002/0096950 A1 Jul. 25, 2002

(30) Foreign Application Priority Data

Jan. 24, 2001 (JP) ......................... 2001-015637
Feb. 23, 2001 (JP) ......................... 2001-047994
Mar. 13, 2001 (JP) ......................... 2001-070014

(51) Int. Cl.[7] ..................... H02K 7/06; H02K 7/075; H02K 21/12
(52) U.S. Cl. ................ 310/81; 310/156.12; 310/156.39
(58) Field of Search .................. 310/81, 156.12, 310/156.38, 156.39; 340/407.1, 384, 385, 388; 381/301

(56) References Cited

U.S. PATENT DOCUMENTS 5,471,103 A * 11/1995 Fujii ..................... 310/81
6,326,711 B1 * 12/2001 Yamaguchi et al. .......... 310/81
6,384,498 B1 * 5/2002 Yamaguchi et al. .......... 310/81
6,417,589 B1 * 7/2002 Kuyama et al. ............. 310/81
6,479,914 B2 * 11/2002 Yoshida et al. ............. 310/81
6,566,772 B2 * 5/2003 Yamaguchi ................ 310/81

FOREIGN PATENT DOCUMENTS

| JP | 2-17853 | 1/1990 |
| JP | 7-20063 | 4/1995 |
| JP | 9-93862 | 4/1997 |
| JP | 9-294352 | 11/1997 |
| JP | 11-341769 | 12/1999 |
| JP | 2000-262969 | 9/2000 |

* cited by examiner

Primary Examiner—Tran Nguyen
(74) Attorney, Agent, or Firm—Connolly, Bove, Lodge & Hutz, LLP

(57) ABSTRACT

A vibration type brushless motor A1 in a structure of brushless motor having an outer rotor type core is composed of a shaft 3 of which a bottom end 3a is held by a bearing member 6 so as to rotate freely and a top end 3b is fixed to a center of rotation of a rotor yoke 1, a ring core 4 arranged around the shaft 3 and a rotor yoke 1 having a side section 1b of which a part is cut off radially to the outer circumference direction from the center fixed with the top end 3b of the shaft 3, wherein a semi-annular magnet 2 is fixed to the rotor yoke 1 along the side section 1b with facing the ring core 4.

6 Claims, 13 Drawing Sheets

VIBRATION TYPE BRUSHLESS MOTOR

BACKGROUND OF THE INVENTION

1. Field of the Invention

The present invention relates to a vibration type brushless motor utilized for a vibration generating source of a pager and a portable telephone for which demand is rapidly increasing.

2. Description of the Related Art

FIG. 23 is an exploded view of a vibration type motor of the prior art.

FIG. 24 is a cross sectional view of another vibration type motor of the prior art.

FIG. 25 is a perspective view of a rotor utilized for a vibration type motor of the prior art.

FIG. 26 is a perspective view of another type of rotor utilized for a vibration type motor of the prior art.

The Japanese Patent Application Laid-open Publication No. 7-20063/1995 discloses the vibration type motor shown in FIG. 23. As shown in FIG. 23, an unbalance-weight 9 is inserted into a shaft P3. By the rotation of the shaft P3 mounted with the unbalance-weight 9, vibration is generated.

The Japanese Patent Application Laid-open Publications No. 9-93862/1997 and No. 2000-262969 disclose a vibration type motor shown in FIG. 24. As shown in FIG. 24, an unbalance-weight 9 is mounted on an outer circumference area of a rotor 8. Vibration is generated by rotating the rotor 8 mounted with the unbalance-weight 9. Further, the Japanese Patent Application Laid-open Publication No. 11-341769/1999 also discloses the similar construction to the vibration type motor shown in FIG. 24.

The Japanese Patent Application Laid-open Publications No. 2-17853/1990 and No. 9-294352/1997 disclose a rotor 8 shown in FIGS. 25 and 26 respectively. In FIG. 25, a part of a flat coil 10 is removed from the rotor 8. In FIG. 26, a weight 11 is provided on the rotor 8 instead of a flat coil having been removed. In either case, the rotor 8 generates vibration due to unbalanced rotation of the rotor 8.

Furthermore, the Japanese Patent Application Laid-open Publication No. 2-17853/1990 discloses that vibration caused by unbalanced rotation of a rotor is generated by reducing a number of windings or coil shape of one coil out of three air-core coils. Moreover, the Japanese Patent Application Laid-open Publication No. 9-93862/1997 discloses that vibration is generated by a rotation of rotor of which center of gravity is shifted eccentrically by attaching a deformed metal member having high specific gravity on an outer circumference area of a coreless rotor formed integrally with air-core coils by resin.

As mentioned above, each vibration type motor disclosed by the Japanese Patent Application Laid-open Publication Nos. 7-20063/1995, 9-93862/1997 and 2000-262969 is on the basis of the construction of mounting the unbalance weigh on the shaft. Consequently, a total cost of the vibration type motor increases by the unbalance weigh in addition to the basic part cost of the motor itself. Further, manpower for mounting the unbalance-weight on the shaft also increases. Furthermore, it is hard to miniaturize a motor having such the construction because an extra space for rotating the unbalance-weight is necessary for the motor externally or internally.

In the case of each vibration type motor disclosed by the Japanese Patent Application Laid-open Publication Nos. 2-17853/1990 and 9-294352/1997, its construction is composed of a movable flat coil. However, higher effect of vibration can not be obtained.

In the case of the vibration type motor disclosed by the Japanese Patent Application Laid-open Publication No. 2-17853/1990, mass of the air-core coil itself is too small to obtain enough vibration. In the case of the vibration type motor disclosed by the Japanese Patent Application Laid-open Publication No. 9-93862/1997, there also existed a problem such that the deformed member formed by a metal having high specific gravity is essential.

SUMMARY OF THE INVENTION

Accordingly, in consideration of the above-mentioned problems of the prior art, an object of the present invention is to provide a vibration type motor, which can improve vibration effect without increasing cost or manpower for assembling.

In order to achieve the above object, the present invention provides, according to a first aspect thereof, a vibration type brushless motor in a structure of brushless motor having an outer rotor type core comprising: a rotor yoke; a shaft of which one end is held by a bearing member so as to rotate freely and another end is fixed to a center of rotation of the rotor yoke; a magnet in an arc; and a ring core arranged around the shaft, the rotor yoke having a side section being formed in a shape of which a part is cut off radially to the outer circumference direction from the center of rotation of the rotor yoke fixed with the other end of the shaft, wherein the ring magnet is fixed to the side section of the rotor yoke with facing the ring core, the vibration type brushless motor is further characterized in that vibration is generated by unbalanced vibration of the rotor yoke.

According to a second aspect of the present invention, there provided a vibration type brushless motor in a structure of brushless motor having an outer rotor type core comprising: a rotor yoke; a shaft of which one end is held by a bearing member so as to rotate freely and another end is fixed to a center of rotation of the rotor yoke; a magnet in an arc; and a ring core arranged around the shaft, the rotor yoke having a ceiling section formed in a disc shape with centering the center of rotation of the rotor yoke fixed with the other end of the shaft and a side section connecting with an outer circumference edge of the ceiling section, wherein a part of the side section is cut off in a circular arc, and wherein the ring magnet is fixed to the side section of the rotor yoke with facing the ring core, the vibration type brushless motor is further characterized in that vibration is generated by unbalanced vibration of the rotor yoke.

According to a third aspect of the present invention, there provided a vibration type brushless motor in a structure of brushless motor having an outer rotor type core comprising: a rotor yoke; a shaft of which one end is held by a bearing member so as to rotate freely and another end is fixed to a center of rotation of the rotor yoke; a magnet in an arc; and a ring core arranged around the shaft, the rotor yoke having a ceiling section formed in a disc shape with centering the center of rotation of the rotor yoke fixed with the other end of the shaft and a side section connecting with an outer circumference edge of the ceiling section, wherein a part of the ceiling section is cut off radially to an outer circumference direction from the center of rotation of the rotor yoke, and wherein the ring magnet is fixed to the side section of the rotor yoke with facing the ring core, the vibration type brushless motor is further characterized in that vibration is generated by unbalanced vibration of the rotor yoke.

According to a fourth aspect of the present invention, there provided a vibration type brushless motor in a structure of an axial gap type brushless motor comprising: a rotor composed of a rotor yoke having a ceiling section, a magnet fixed to the rotor yoke and a shaft of which one end of the shaft is fixed to a center of rotation of the rotor yoke and another end of the shaft is held by a bearing member so as to rotate freely; and a plurality of air-core coils arranged in a ring around the bearing member, the magnet in one shape out of a circular arc of which a part is cut off radially to an outer circumference direction from the center of rotation of the rotor yoke and a disc of which a part is cut off a part of the magnet, wherein the ring magnet is arranged to face the plurality of air-core coils, the vibration type brushless motor is further characterized in that vibration is generated by unbalanced vibration of the rotor.

According to a fifth aspect of the present invention, there provided a vibration type brushless motor in a structure of an axial gap type brushless motor comprising: a rotor composed of a rotor yoke having a ceiling section, a magnet fixed to the rotor yoke and a shaft, wherein one end of the shaft is fixed to a center of rotation of the rotor yoke and another end of the shaft is held by a bearing member so as to rotate freely; and a plurality of air-core coils arranged in a ring around the bearing member, the magnet in a disc shape having a hollow section in an approximate circle being provided so as to surround the center of rotation, wherein the magnet has a center being shifted from the center of rotation of the rotor yoke and is arranged to face the plurality of air-core coils, the vibration type brushless motor is further characterized in that vibration is generated by unbalanced vibration of the rotor caused by the shifted center of the hollow section with respect to the center of rotation of the rotor yoke.

According to a sixth aspect of the present invention, there provided a vibration type brushless motor comprising: a rotor composed of a rotor yoke, a ring magnet fixed to the rotor yoke and a shaft, wherein one end of the shaft is fixed to a center of rotation of the rotor yoke and another end of the shaft is held by a bearing member so as to rotate freely; and a core having a plurality of salient poles arranged in a ring around the bearing member, the ring magnet having an inner hole and facing the core having the plurality of salient poles, wherein a center of the inner hole coincides with the center of rotation of the rotor yoke, and wherein a center of the outer circumference of the ring magnet is shifted from the center of rotation of the rotor yoke by a predetermined shifting distance, the vibration type brushless motor is further characterized in that vibration is generated by unbalanced vibration of the rotor.

According to a seventh aspect of the present invention, there provided a vibration type brushless motor comprising: a rotor composed of a rotor yoke, a ring magnet fixed to the rotor yoke and a shaft, wherein one end of the shaft is fixed to a center of rotation of the rotor yoke and another end of the shaft is held by a bearing member so as to rotate freely; and a core having a plurality of salient poles arranged in a ring around the bearing member, the ring magnet having an inner hole and facing the core having the plurality of salient poles, wherein both a center of the inner hole and a center of an outer circumference of the ring magnet coincide with the center of rotation of the rotor yoke within a range of approximately 0 to 180 degrees in the mechanical angle with centering the center of rotation of the rotor yoke, and wherein the center of the inner hole coincides with the center of rotation of the rotor yoke within a range of approximately 180 to 360 degrees in the mechanical angle, and wherein the center of the outer circumference of the ring magnet is shifted from the center of rotation of the rotor yoke by a predetermined shifting distance within a range of approximately 180 to 360 degrees in the mechanical angle, the vibration type brushless motor is further characterized in that vibration is generated by unbalanced vibration of the rotor.

According to an eighth aspect of the present invention, there provided a vibration type brushless motor comprising: a rotor composed of a rotor yoke, a magnet in disc shape fixed to the rotor yoke and a shaft, wherein one end of the shaft is fixed to a center of rotation of the rotor yoke and another end of the shaft is held by a bearing member so as to rotate freely; and a plurality of air-core coils arranged in a ring around the bearing member, the magnet having an inner hole, wherein a center of the inner hole coincides with the center of rotation of the rotor yoke, and wherein a center of an outer circumference of the magnet is shifted from the center of rotation of the rotor yoke by a predetermined shifting distance, the vibration type brushless motor is further characterized in that vibration is generated by unbalanced vibration of the rotor.

According to a ninth aspect of the present invention, there provided a vibration type brushless motor comprising: a rotor composed of a rotor yoke, a magnet in disc shape fixed to the rotor yoke and a shaft, wherein one end of the shaft is fixed to a center of rotation of the rotor yoke and another end of the shaft is held by a bearing member so as to rotate freely; and a plurality of air-core coils arranged in a ring around the bearing member, the ring magnet having an inner hole, wherein both a center of the inner hole and a center of an outer circumference of the ring magnet coincide with the center of rotation of the rotor yoke within a range of approximately 0 to 180 degrees in the mechanical angle with centering the center of rotation of the rotor yoke, and wherein the center of the inner hole coincides with the center of rotation of the rotor yoke within a range of approximately 180 to 360 degrees in the mechanical angle, and wherein the center of the outer circumference of the ring magnet is shifted from the center of rotation of the rotor yoke by a predetermined shifting distance within a range of approximately 180 to 360 degrees in the mechanical angle, the vibration type brushless motor is further characterized in that vibration is generated by unbalanced vibration of the rotor.

Other object and further features of the present invention will be apparent from the following detailed description when read in conjunction with the accompanying drawings.

DETAILED DESCRIPTION OF THE PREFERRED EMBODIMENTS

[First Embodiment]

Figure 1:
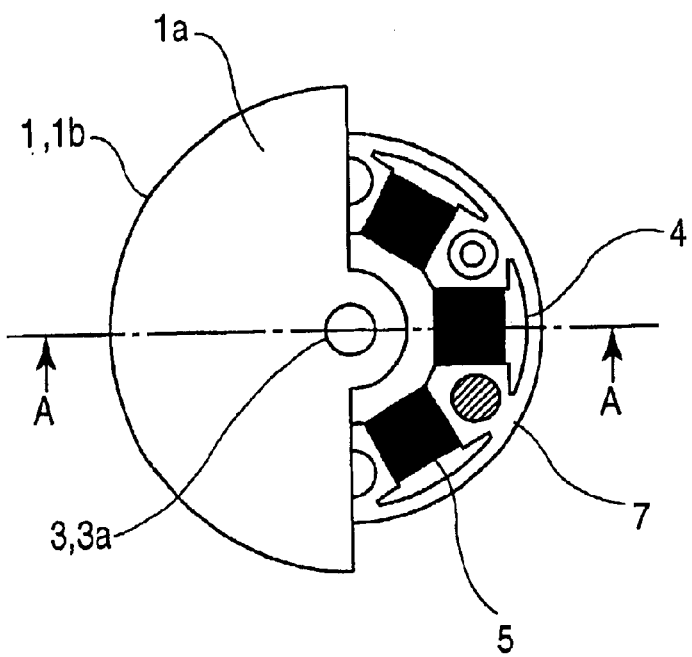
FIG. 1 is a plan view of a vibration type brushless motor according to a first embodiment of the present invention.

FIG. 1 is a plan view of a vibration type brushless motor according to a first embodiment of the present invention.

Figure 2:
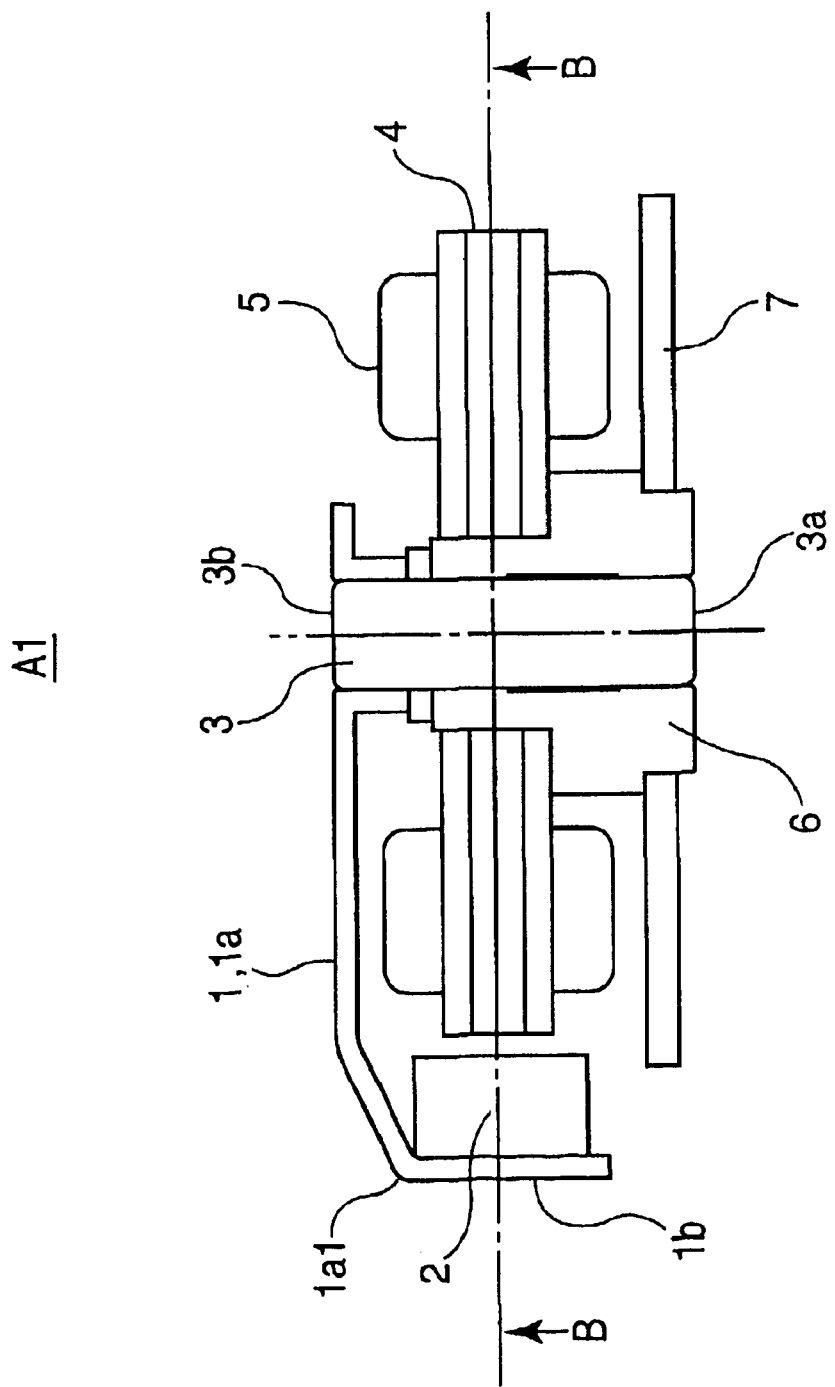
FIG. 2 is a cross sectional view of the vibration type brushless motor taken substantially along line A—A of FIG. 1.

FIG. 2 is a cross sectional view of the vibration type brushless motor taken substantially along line A—A of FIG. 1.

Figure 3:
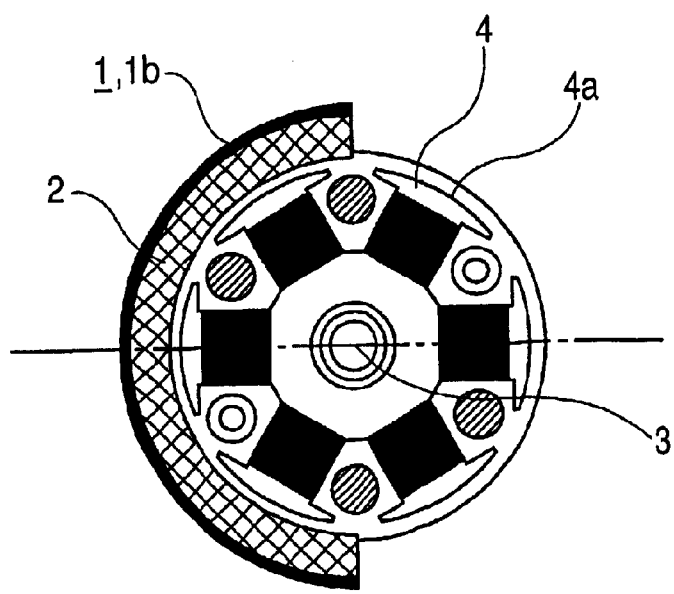
FIG. 3 is a fragmentary cross sectional view of the vibration type brushless motor taken along line B—B in FIG. 2.

FIG. 3 is a fragmentary cross sectional view of the vibration type brushless motor taken along line B—B in FIG. 2.

Figure 4A:
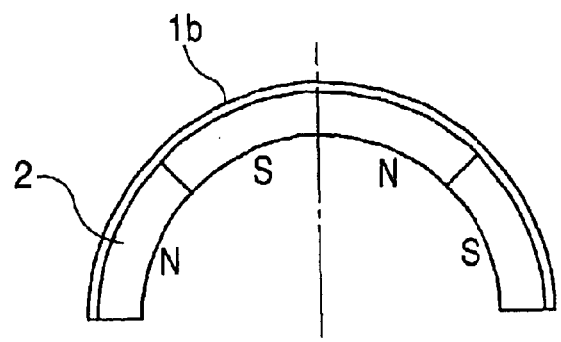
FIG. 4(a) is a plan view of a semi-annular magnet showing magnetization according to the first embodiment of the present invention
Figure 4B:
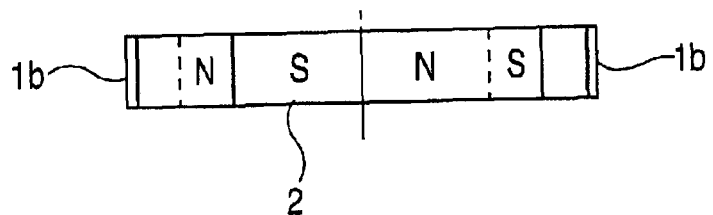
FIG. 4(b) is a side elevation view of the semi-annular magnet shown in FIG. 4(a).

FIGS. 4(a) and 4(b) show magnetization of a semi-annular magnet according to the first embodiment of the present invention In FIGS. 1 through 4(b), a vibration type brushless motor A1 is composed of a rotor yoke 1, a semi-annular magnet 2, a shaft 3 fixed in the center of rotation of the rotor yoke 1, a ring core 4, a coil 5, a bearing member 6 and a metal based printed circuit board 7. The rotor yoke 1 is further composed of a ceiling section 1a, a flange section 1a and a side section 1b, and can rotate freely through the bearing member 6. Further, the shaft 3 has a bottom end 3a and a top end 3b. Furthermore, the ring core 4 has six salient poles 4a protruding toward an outer circumferential direction. The coil 5 is wound around each of the salient poles 4a.

The bearing member 6 is a sintered bearing impregnated with oil, and is staked with the metal based printed circuit board 7 on the bottom and pressed into an inner circumferential hole of the ring core 4 on top.

The semi-annular magnet 2 is fixed to the inside of the side section 1b of the rotor yoke 1 having a shape of a cup cut in half. The semi-annular magnet 2 is magnetized in 2n magnetic poles with arranging the N and S magnetic poles alternately, where "n" is the positive integer. In FIGS. 4(a) and 4(b), two pairs of the N and S magnetic poles, that is, four magnetic poles are magnetized in the semi-annular magnet 2 having an angle of 180 degrees.

As shown in FIGS. 4(a) and 4(b), the semi-annular magnet 2 of the first embodiment is magnetized in all area of the magnet. In other wards, the magnetized area coincides with the total arc of the semi-annular magnet 2. Supplying electric current to the coil 5 wound around the salient pole 4a generates rotation-driving force. The semi-annular magnet 2 is in a shape of ring cut in half. Therefore, the center of rotation differs from the center of gravity of the rotor yoke 1. Accordingly, the rotor yoke 1 in rotating can generate vibration.

[Second Embodiment]

A vibration type brushless motor of a second embodiment is identical with that of the first embodiment except for a rotor section. Therefore, the same functions and configurations as the first embodiment are omitted to explain in this embodiment.

Figure 5:
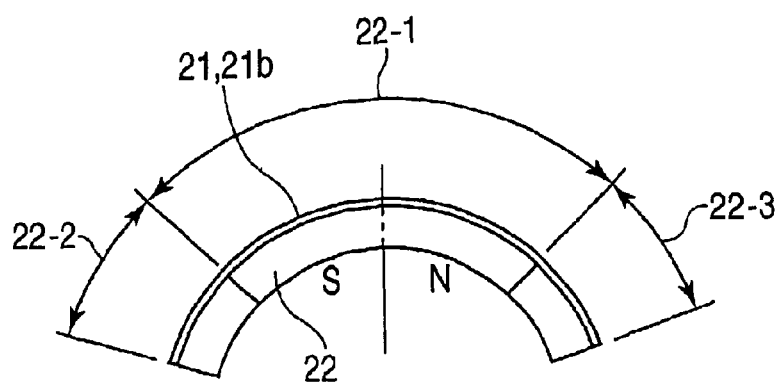
FIG. 5 is a plan view showing magnetization of a semi-annular magnet utilized for a vibration type brushless motor according to a second embodiment of the present invention.

FIG. 5 is a plan view showing magnetization of a semi-annular magnet utilized for a vibration type brushless motor according to the second embodiment of the present invention.

In FIG. 5, a rotor yoke 21 is composed of a side section 21b and fixed with a magnet 22 on the inner side of the side section 21b. The magnet 22 is shaped in a ring of which a part is cut off and provided with a magnetized section 22-1 and two non-magnetized sections 22-2 and 22-3 on the both sides of the magnetized section 22-1. The magnetized section 22-1 is magnetized in 2n magnetic poles with arranging the N and S magnetic poles alternately, where "n" is the positive integer.

The magnetized section 22-1 can be allocated to any area within the magnet 22. A number of magnetized poles 2n and a magnetized section are set up for driving a motor, wherein "n" is the positive integer. Therefore, conditions for magnetization are defined by some factors such as a number of salient poles 4a of the core 4 and a winding method of the coil 5.

Further, a shape or a dimension of the magnet 22 is defined in accordance with a required amount of vibration. Therefore, as mentioned above, a dimension or a length of circular arc of the magnetized section 22-1 is not necessary to coinciding with that of the non-magnetized section 22-2 or 22-3.

[Third Embodiment]

A vibration type brushless motor of a third embodiment is identical with that of the first embodiment except for a rotor yoke. Therefore, the same functions and configurations as the first embodiment are omitted to explain in this embodiment.

Figure 6A:
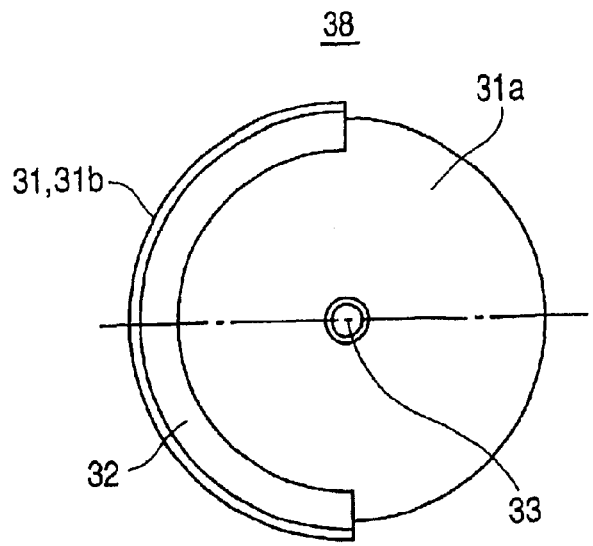
FIG. 6(a) is a bottom view of a rotor yoke utilized for a vibration type brushless motor according to a third embodiment of the present invention.

FIG. 6(a) is a bottom view of a rotor utilized for a vibration type brushless motor according to the third embodiment of the present invention.

Figure 6B:
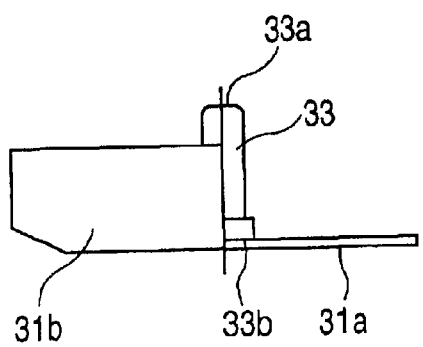
FIG. 6(b) is a side elevation view of the rotor yoke shown in FIG. 6(a).

FIG. 6(b) is a side elevation view of the rotor shown in FIG. 6(a).

As shown in FIGS. 6(a) and 6(b), a rotor 38 is composed of a rotor yoke 31, a semi-annular magnet 32 and a shaft 33. The rotor yoke 31 is further composed of a side section 31b and a ceiling section 31a, which is shaped in a disc although the ceiling section 1a of the first embodiment is shaped in half a disc. Further, the rotor yoke 31 is fixed with the semi-annular magnet 32 on the inside of the side section 31b of the rotor yoke 31 and the shaft 33 is mounted in the center of the ceiling section 31a or a center of rotation of the rotor 38. Furthermore, the side section 31b is shaped in semi-annular. Therefore, the rotor 38 is unbalanced in weight. Accordingly, the rotor 38 itself generates vibration while rotating.

[Fourth Embodiment]

A vibration type brushless motor of a fourth embodiment is identical with that of the first embodiment except for a rotor yoke. Therefore, the same functions and configurations as the first embodiment are omitted in this embodiment.

Figure 7:
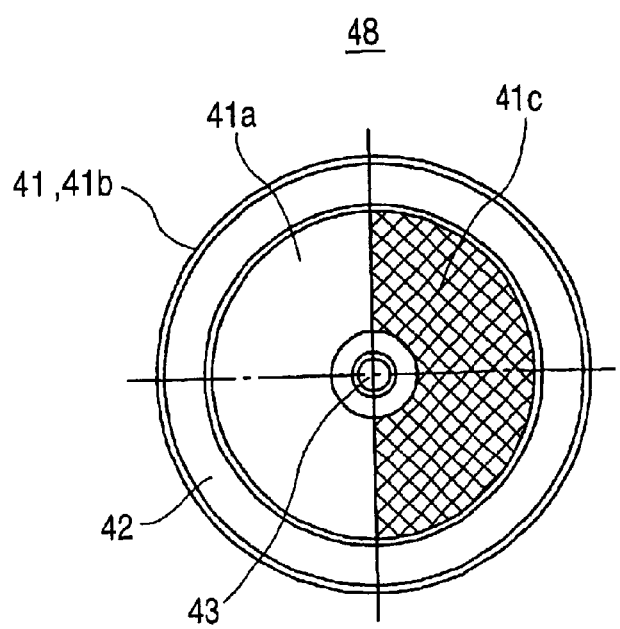
FIG. 7 is a plan view of a rotor yoke utilized for a vibration type brushless motor according to a fourth embodiment of the present invention.

FIG. 7 is a plan view of a rotor utilized for a vibration type brushless motor according to the fourth embodiment of the present invention. In FIG. 7, a rotor 48 is composed of a rotor yoke 41, a ring magnet 42 and a shaft 43. The rotor yoke 41 is further composed of a ceiling section 41a and a side section 41b shaped in a ring. Further, the rotor yoke 41 is fixed with the ring magnet 42 inside the side section 41b and a shaft 43 mounted in the center of the ceiling section 41a. Furthermore, by cutting off a part of the ceiling section 41a as a cutout section 41c shown as a crosshatching area in FIG. 7 so as to shift the center of gravity of the rotor yoke 41, the rotor yoke 41 generates vibration while rotating. An area of cutout section can be arbitrary allocated to the side section 41b or the ceiling section 41a on the basis of a necessary amount of vibration.

[Fifth Embodiment]

A vibration type brushless motor of a fifth embodiment is identical with that of the first embodiment except for a rotor yoke. Therefore, the same functions and configurations as the first embodiment are omitted to explain in this embodiment.

Figure 8:
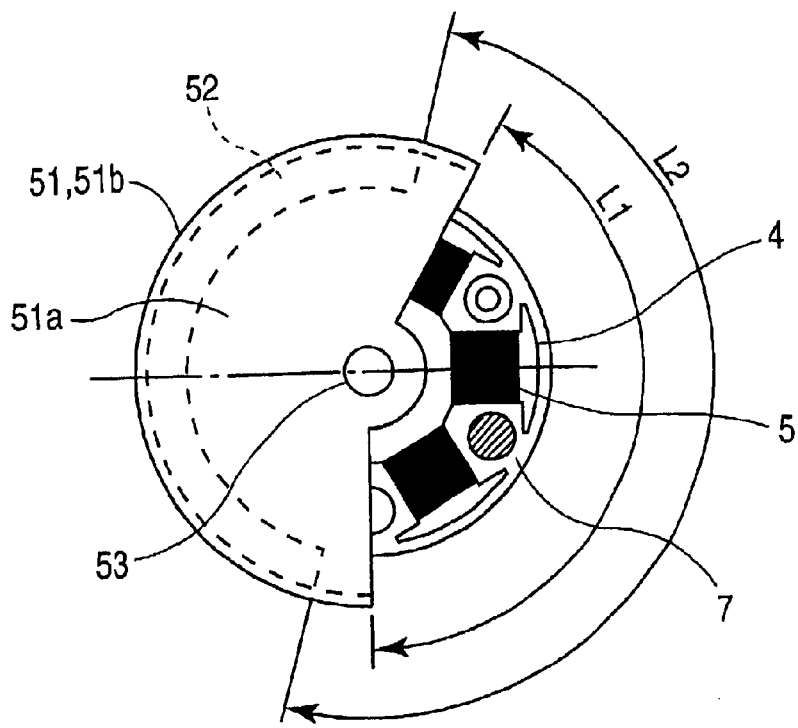
FIG. 8 is a plan view of a vibration type brushless motor according to a fifth embodiment of the present invention.

FIG. 8 is a plan view of a vibration type brushless motor according to a fifth embodiment of the present invention.

In FIG. 8, a vibration type brushless motor D1 is composed of a rotor yoke 51, a magnet 52 in an arc shape, a shaft 53, the ring core 4, the coil 5 and the metal based printed circuit board 7. The rotor yoke 51 is further composed of a ceiling section 51a shaped in sectorial and a side section 51b. The magnet 52 is fixed on the inner wall of the side section 51b.

As shown in FIG. 8, a part of the ceiling section 51a is cut off from a disc by an arc length of L1 and a part of the magnet 52 is also cut off from a ring by an arc length of L2. A relative allocation of a cutout section of the ceiling section 51a of which the arc length is L1 and another cutout section of the magnet 52 of which the arc length is L2 can be altered in accordance with necessity. Further, a magnetizing area and an arc length of the magnet 52 and a cutout dimension of the rotor yoke 51 can be arbitrary defined in accordance with a necessary amount of vibration and their combination can also be set arbitrary in accordance with necessity. Furthermore, a cutout section can be provided on either the side section 51b or the ceiling section 51a, or provided on both the ceiling section 51a and the side section 51b.

According to each embodiment of the present invention mentioned above, a necessary amount of vibration can be obtained by the least necessary component parts such as the rotor yoke 1, 21, 31, 41 or 51 and the magnet 2, 22, 32, 42 or 52 for driving a motor without equipping an unbalance-weight being necessary for a conventional vibration type motor to generate vibration.

Further, the magnet 2, 22, 32, 42 or 52 of which mass is larger than that of the coil 5 is formed in an unbalanced shape and used. Therefore, it is effective that a vibration type brushless motor of the present invention can obtain larger vibration by adding the same amount of energy as for a conventional vibration type motor.

Furthermore, a cutout shape cut out from the rotor yoke 1, 21, 31, 41 or 51 and the magnet 2, 22, 32, 42 or 52 can be arbitrary designated, so that the arc length or angle L1 and L2 shown in FIG. 8 can be designated in accordance with a necessary amount of vibration.

Moreover, by cutting off a part of the magnet 2, 22, 32, 42 or 52 can reduce the mass of the magnet. Therefore, it is possible to reduce a total weight of motor itself and cost. In addition thereto, generation of chipping or cracking of a magnet, which is a major defect of a ring magnet, can be greatly improved and yield rate of magnet can also be increased. Accordingly, the vibration type brushless motor of the present invention can be utilized for a vibration generating source of a pager and a portable telephone, which require lightweight and saving energy more than ever.

[Sixth Embodiment]

A vibration type brushless motor of a sixth embodiment is a vibration type brushless motor in an axial gap type, which is driven by three phases, and provided with a rotor having a magnet being magnetized in an angle equivalent to four poles in the whole circumference and air-core coils arranged with separation of 120 degrees.

Figure 9:
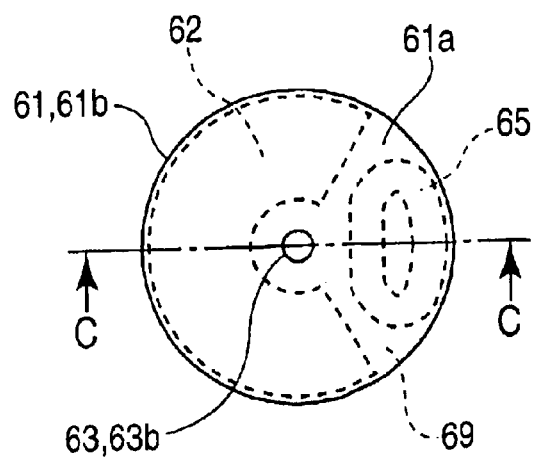
FIG. 9 is a plan view of a vibration type brushless motor according to a sixth embodiment of the present invention.

FIG. 9 is a plan view of a vibration type brushless motor according to the sixth embodiment of the present invention.

Figure 10:
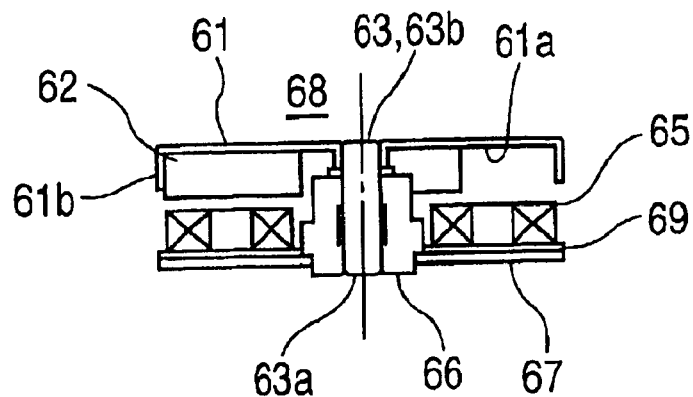
FIG. 10 is a cross sectional view of the vibration type brushless motor taken substantially along line C—C of FIG. 9.

FIG. 10 is a cross sectional view of the vibration type brushless motor taken substantially along line C—C of FIG. 9.

Figure 11:
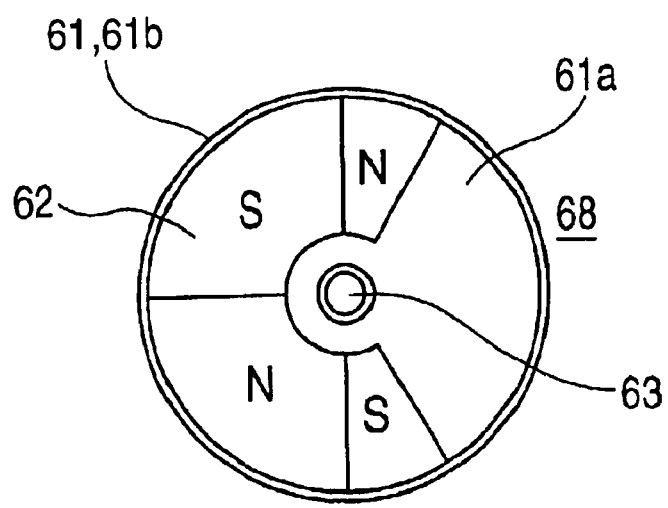
FIG. 11 is a bottom view of a rotor of the vibration type brushless motor shown in FIG. 9.

FIG. 11 is a bottom view of a rotor of the vibration type brushless motor shown in FIG. 9.

In FIGS. 9 through 11, a vibration type brushless motor A2 in the axial gap type is composed of a rotor 68, an air-core coil 65, a bearing member 66, a plate 67 and a printed circuit board 69. The rotor 68 is further composed of a rotor yoke 61 having a ceiling section 61a and a side section 61b, a magnet 62 in a sectorial shape and a shaft 63 having a bottom end 63a and a top end 63b. The top end 63b of the shaft 63 is fixed to the center of rotation of the rotor yoke 61 and the bottom end 63a is held by the bearing member 66 so as to rotate freely. The magnet 62 in a sectorial shape is mounted on the ceiling section 61a of the rotor yoke 61 along the side section 61b and allocated so as to face a plurality of air-core coils 65 mounted on the printed circuit board 69.

The bearing member 66 is a sintered bearing impregnated with oil, and is staked with the plate 67, which is made by a magnetic material and forms a magnetic circuit, on the bottom and holds the shaft 63 fixed to the rotor yoke 61 so as to rotate freely. The printed circuit board 69 is adhered on the top surface of the plate 67 and the plurality of air-core coils 65 are arranged on the top surface of the printed circuit board 69 by using adhesive. As shown in FIG. 11, the magnet 62 is magnetized in two pairs of the N and S magnetic poles or four magnetic poles with arranging the N and S magnetic poles alternately. By supplying electric current to the plurality of air-core coils 65 generates driving force. Since the magnet 62 is shaped in sectorial, that is, a part of ring magnet is cut off, the center of rotation of the rotor yoke 61 is differs from the center of gravity of the magnet 62. Accordingly, vibration is generated by rotation of the rotor 68.

[Seventh Embodiment]

A vibration type brushless motor of a seventh embodiment is identical with that of the sixth embodiment except for a rotor. Therefore, the same functions and configurations as the sixth embodiment are omitted to explain in this embodiment.

Figure 12:
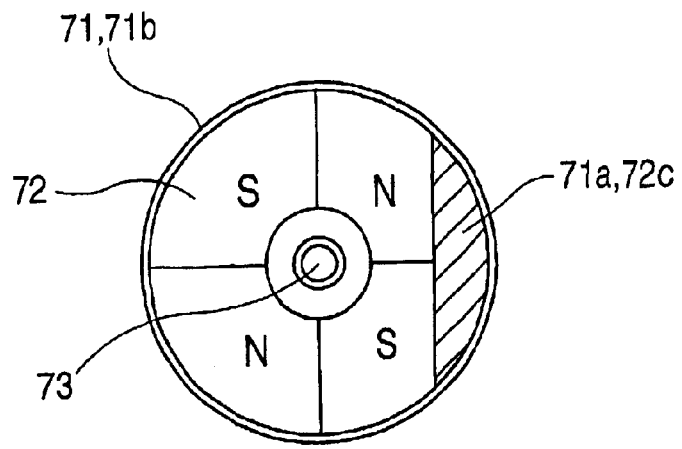
FIG. 12 is a bottom view of a rotor of a vibration type brushless motor according to a seventh embodiment of the present invention.

FIG. 12 is a bottom view of a rotor of a vibration type brushless motor according to the seventh embodiment of the present invention.

In FIG. 12, a rotor 78 is composed of a rotor yoke 71 having a ceiling section 71a and a side section 71b, a ring magnet 72 and a shaft 73, wherein a part of the ring magnet is cut off from the ring as a cutout section 72c. The center of rotation of the rotor yoke 71 differs from the center of gravity of the ring magnet 72 due to the cutout section 72c. Therefore, the rotor 78 generates vibration while the rotor 78 rotates. As shown in FIG. 12, the ring magnet 72 having the cutout section 72c is magnetized in four magnetic poles. Further, the ring magnet 72 in a flat shape is mounted on the ceiling section 71a of the rotor yoke 71 along the side section 71b and allocated so as to face the plurality of air-core coils 65 mounted on the printed circuit board 69 shown in FIG. 10.

[Eighth Embodiment]

A vibration type brushless motor of an eighth embodiment is identical with that of the sixth embodiment except for a rotor. Therefore, the same functions and configurations as the sixth embodiment are omitted to explain in this embodiment.

Figure 13:
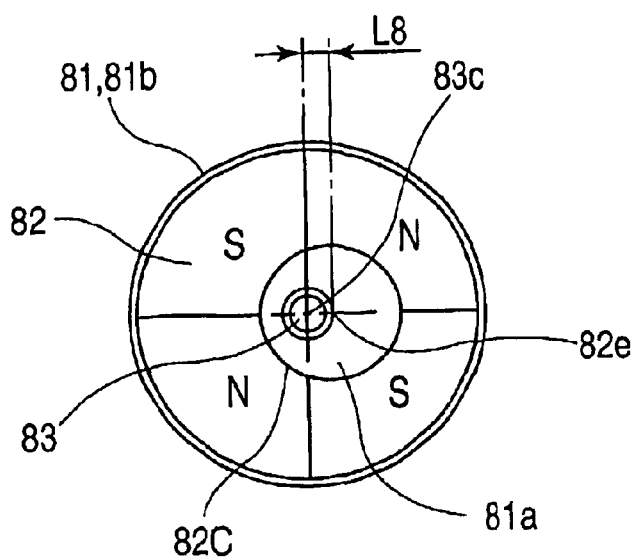
FIG. 13 is a bottom view of a rotor of a vibration type brushless motor according to an eighth embodiment of the present invention.

FIG. 13 is a bottom view of a rotor of a vibration type brushless motor according to the eighth embodiment of the present invention. In FIG. 13, a rotor 88 is composed of a rotor yoke 81 having a ceiling section 81a and a side section 81b, a shaft 83 and a ring magnet 82 having a center hole 82c of which center 82e is shifted from a center of the ring magnet 82 eccentrically. As shown in FIG. 13, the center 82e of the center hole 82c of the ring magnet 82 is shifted from a center 83c of rotation of the rotor yoke 81 by a shifting distance L8. Therefore, unbalanced vibration can be generated by the rotation of the rotor yoke 81. Further, the ring magnet 82 having the center hole 82c arranged eccentrically is magnetized in four magnetic poles or two pairs of the N and S magnetic poles. Furthermore, the ring magnet 82 in a flat shape is mounted on the ceiling section 81a of the rotor yoke 81 along the side section 81b and arranged so as to face the plurality of air-core coils 65 mounted on the printed circuit board 69 shown in FIG. 10.

[Ninth Embodiment]

A vibration type brushless motor of a ninth embodiment is identical with that of the sixth embodiment except for a rotor. Therefore, the same functions and configurations as the sixth embodiment are omitted to explain in this embodiment.

Figure 14:
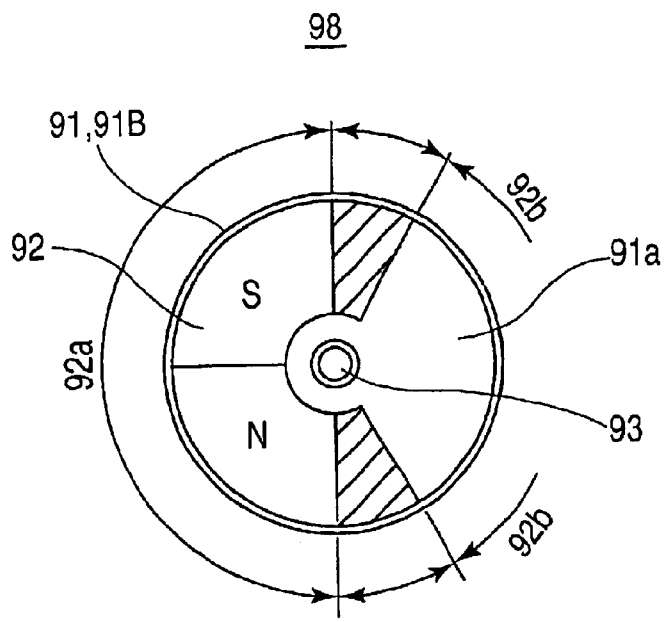
FIG. 14 is a bottom view of a rotor of a vibration type brushless motor showing magnetization of a magnet in a sectorial shape according to a ninth embodiment of the present invention.

FIG. 14 is a bottom view of a rotor of a vibration type brushless motor showing magnetization of a magnet in a sectorial shape according to the ninth embodiment of the present invention.

In FIG. 14, a rotor 98 is composed of a rotor yoke 91 having a ceiling section 91a and a side section 91b, a magnet 92 in a sectorial shape and a shaft 93. As shown in FIG. 14, a magnetized section 92a is allocated to a part of the magnet 92 and the magnetized section 92a is magnetized in two magnetic poles or one pair of the N and S magnetic poles. Further, two non-magnetized sections 92b are allocated to the both sides of the magnetized section 92a. Furthermore, a location of the magnetized section 92a is not limited to the position shown in FIG. 14. The magnetized section 92a can be arranged in any area of the magnet 92 in the sectorial shape.

In this ninth embodiment, as shown in FIG. 14, a number of magnetic poles of the magnet 93 is two, that is, one pair of the N and S magnetic poles. However, the number of magnetic poles can be designated as "2n" magnetic poles in accordance with a motor specification, wherein "n" is the positive integer. Further, a number of magnetic poles to be magnetized can be arbitrary defined by conditions such as total quantities of the coil 65 and its winding method. Furthermore, a shape of the magnet 92 in the sectorial shape is defined in accordance with a required amount of vibration. Therefore, as mentioned above, an area of the magnetized section 92a is not necessary to coinciding with a dimension or an arc length of the magnet 92.

[Tenth Embodiment]

A vibration type brushless motor of a tenth embodiment is identical with that of the sixth embodiment except for a rotor. Therefore, the same functions and configurations as the sixth embodiment are omitted to explain in this embodiment.

Figure 15A:
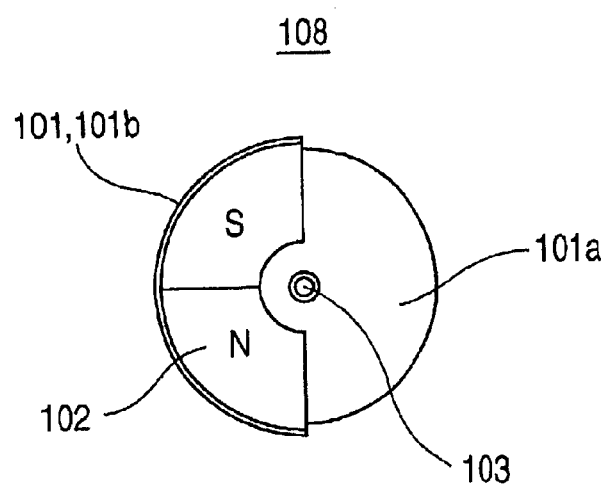
FIG. 15(a) is a bottom view of a rotor of a vibration type brushless motor showing magnetization of a semi-annular magnet according to a tenth embodiment of the present invention.
Figure 15B:
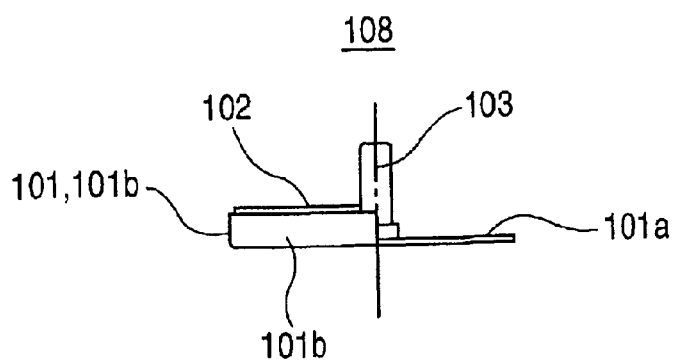
FIG. 15(b) is a side elevation view of the rotor shown in FIG. 15(a).

FIG. 15(*a*) is a bottom view of a rotor of a vibration type brushless motor showing magnetization of a semi-annular magnet according to the tenth embodiment of the present invention.

FIG. 15(*b*) is a side elevation view of the rotor shown in FIG. 15(*a*).

In FIGS. 15(*a*) and 15(*b*), a rotor 108 is composed of a rotor yoke 101 having a ceiling section 101a and a side section 101b, a semi-annular magnet 102 and a shaft 103. As shown in FIG. 15(*a*), the semi-annular magnet 102 is magnetized in two magnetic poles, that is, one pair of the N and S magnetic poles and fixed on the ceiling section 101a of the rotor yoke 101 along the side section 101b. Further, the semi-annular magnet 102 is allocated so as to face the plurality of air-core coils 65 arranged on the printed circuit board 69 shown in FIG. 10. As shown in FIG. 15(*b*), the rotor 108 is unbalanced in weight. Therefore, the center of gravity of the semi-annular magnet 102 is shifted from the center of rotation of the rotor yoke 101. Accordingly, vibration can be generated by the rotation of the rotor 108.

[Eleventh Embodiment]

A vibration type brushless motor of an eleventh embodiment is identical with that of the sixth embodiment except for a rotor. Therefore, the same functions and configurations as the sixth embodiment are omitted to explain in this embodiment.

Figure 16:
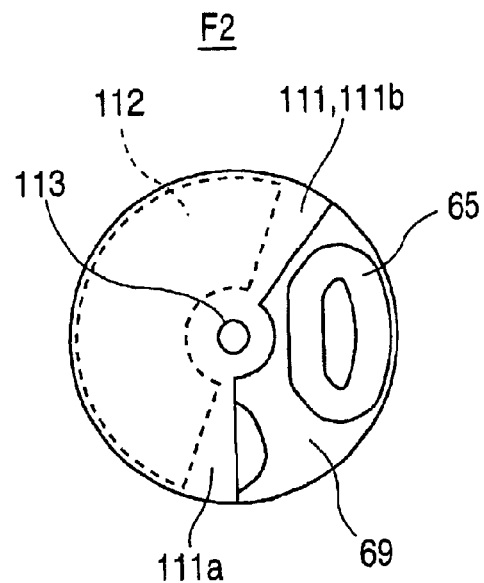
FIG. 16 is a plan view of a vibration type brushless motor according to an eleventh embodiment of the present invention.

FIG. 16 is a plan view of a vibration type brushless motor according to the eleventh embodiment of the present invention.

In FIG. 16, a vibration type brushless motor F2 is composed of a rotor yoke 111 having a ceiling section 111a and a side section 111b, a semi-annular magnet 112, a shaft 113, the air-core coil 65 and the printed circuit board 69. As shown in FIG. 16, the ceiling section 111a is shaped in sectorial and the semi-annular magnet 112 is fixed underneath the ceiling section 111a along the side section 111b. In other words, the ceiling section 111a is formed by cutting off a part of a circular ceiling section radially from the center of rotation of the rotor yoke 111 in the radial direction toward the outer circumference.

By shifting the center of gravity of the semi-annular magnet 112 from the center of rotation of the rotor yoke 111, vibration can be generated while the rotor yoke 111 rotates. An area cut off from the ceiling section 111a or the side section 111b can be arbitrary designated on the basis of a necessary amount of vibration. Further, the vibration type brushless motor F2 of the eleventh embodiment is characterized in that an arc length of the ceiling section 111a differs from that of the semi-annular magnet 112. Furthermore, both the ceiling section 111a and the side section 111b of the rotor yoke 111 can be cut off partially.

According to each vibration type brushless motor of each embodiment of the present invention mentioned above, a necessary amount of vibration can be easily obtained by the least necessary component parts such as the rotor yoke 61, 71, 81, 91, 101 or 111 and the magnet 62, 72, 82, 92, 102 or 112 for driving a motor without an unbalance-weight. Further, each magnet and each rotor yoke, which are heavier in mass than the air-core coil 65, are formed in an unbalanced shape. Therefore, it is effective that each vibration type brushless motor of the present invention can generate larger vibration by adding the same amount of energy as for a conventional vibration type motor. Furthermore, a cutout shape cut out from the rotor yoke and the magnet can be arbitrary designated, so that the arc length or angle of the rotor yoke or the magnet can be designated in accordance with a necessary amount of vibration. More, by cutting off a part of the magnet can reduce the mass of the magnet. Therefore, it is possible to reduce a total weight of motor itself and cost. Moreover, generation of chipping or cracking of magnet, which is a major defect of a ring magnet, can be greatly improved and yield rate of magnet can also be increased.

In addition thereto, each embodiment mentioned above explains an example in a configuration of 3-phase 4-pole three air-core coils. However, by selecting an arbitrary number of phases, a number of magnetic poles in 2n poles, where "n" is the positive integer, an arbitrary number of air-core coils and an allocation of the air-core coils in accordance with a motor specification, the effect of the present invention can be obtained. Accordingly, the vibration type brushless motor of the present invention can be utilized for a vibration generating source of a pager and a portable telephone, which require lightweight and saving energy more than ever.

[Twelfth Embodiment]

Figure 17:
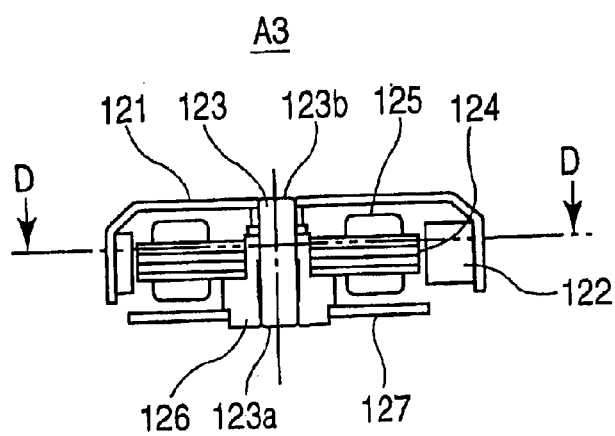
FIG. 17 is a cross sectional view of a vibration type brushless motor according to a twelfth embodiment of the present invention.

FIG. 17 is a cross sectional view of a vibration type brushless motor according to a twelfth embodiment of the present invention.

Figure 18:
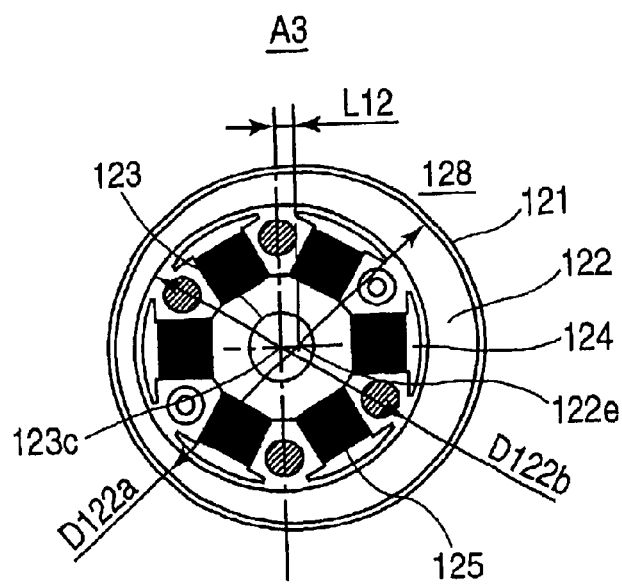
FIG. 18 is a fragmentary cross sectional view of the vibration type brushless motor taken along line D—D in FIG. 17.

FIG. 18 is a fragmentary cross sectional view of the vibration type brushless motor taken along line D—D in FIG. 17.

In FIGS. 17 and 18, a vibration type brushless motor A3 is composed of a rotor 128 and a stator, which face toward each other. The rotor 128 is further composed of a rotor yoke 121, a ring magnet 122 and a shaft 123 having a bottom end 123a and a top end 123b. The stator is further composed of a core 124 having a plurality of salient poles, a coil 125 wound around each of the plurality of salient poles, a bearing member 126 and a printed circuit board 127. In FIG. 18, the ring magnet 122 of outer diameter D122a has an inner hole of diameter D122b, which is arranged eccentric to a center 122e of outer circumference of the ring magnet 122. The center 122e of the ring magnet 122 is shifted from a center 123c of rotation of the rotor yoke 121 or the shaft 123 by a distance L12. The vibration type brushless motor A3 is a radial gap type brushless motor driven by three phases. Further, the ring magnet 122 is magnetized in eight magnetic poles along a whole circumference with arranging the N and S magnetic poles alternately. Furthermore, the core 124 has six salient poles.

As shown in FIGS. 17 and 18, the outer circumference of the ring magnet 122 is fixed to an inner wall of the rotor yoke 121 in a cup shape. The top end 123b of the shaft 123 is pressed into the rotor yoke 121 and the bottom end 123a is held by the bearing member 126, which is a sintered bearing impregnated with oil, so as to rotate freely. The inner circumference of the ring magnet 122 is magnetized in eight magnetic poles with arranging the N and S magnetic poles alternately.

The core 124 having a plurality of salient poles, which protrude in the radial direction to the outer circumference of the core 124, is fixed to the bearing member 126. Further, the coil 125 is wound around each of the plurality of salient poles. Supplying electric current to each coil 125 generates driving force for rotation. Accordingly, the rotor 128 rotates.

A center of the inner hole having the diameter D122b of the ring magnet 122 coincides with the center 123c of rotation of the shaft 123. On the other hand, the center 122e of the ring magnet 122 does not coincide with the center of the inner hole of the ring magnet 122 or the center 123c of rotation of the shaft 123. Thickness of the ring magnet 122 in the radial direction is uneven with respect to the whole circumference, partially thicker and partially thinner. Accordingly, the rotor 128 rotates in unbalance and can generate vibration.

The shifting distance L12 between the center 123c of rotation of the rotor 128 or the shaft 123 and the center 122e of the ring magnet 122 is prescribed to be approximately 7% of the radius of the inner hole of the ring magnet 122. If the shifting distance L12 is reduced, the outer diameter of the rotor yoke 121 can be reduced. However, a generating amount of unbalanced vibration also decreases. On the contrary, if the shifting distance L12 is increased as large as 50% of the radius of the inner hole of the ring magnet 122, the generating amount of unbalanced vibration increases. However, the outer diameter of the rotor yoke 121 must be enlarged almost twice and the vibration type brushless motor A3 fails to be miniaturized.

Accordingly, the shifting distance L12 is desirable to be within a range of 3 to 20% of the radius of the inner hole of the ring magnet 122. In addition thereto, the center of the inner hole of the ring magnet 122 coincides with a center of the outer circumference formed by the plurality of salient poles. Therefore, a gap between the wall of the inner hole of the ring magnet 122 and a tip of each salient pole is always kept constant. Accordingly, a rotation accuracy of the vibration type brushless motor A3 is always kept excellent.

[Thirteenth Embodiment]

A vibration type brushless motor of a thirteenth embodiment is identical with that of the eleventh embodiment except for a rotor. Therefore, details of the same functions and configurations as the twelfth embodiment are omitted in this embodiment.

Figure 19:
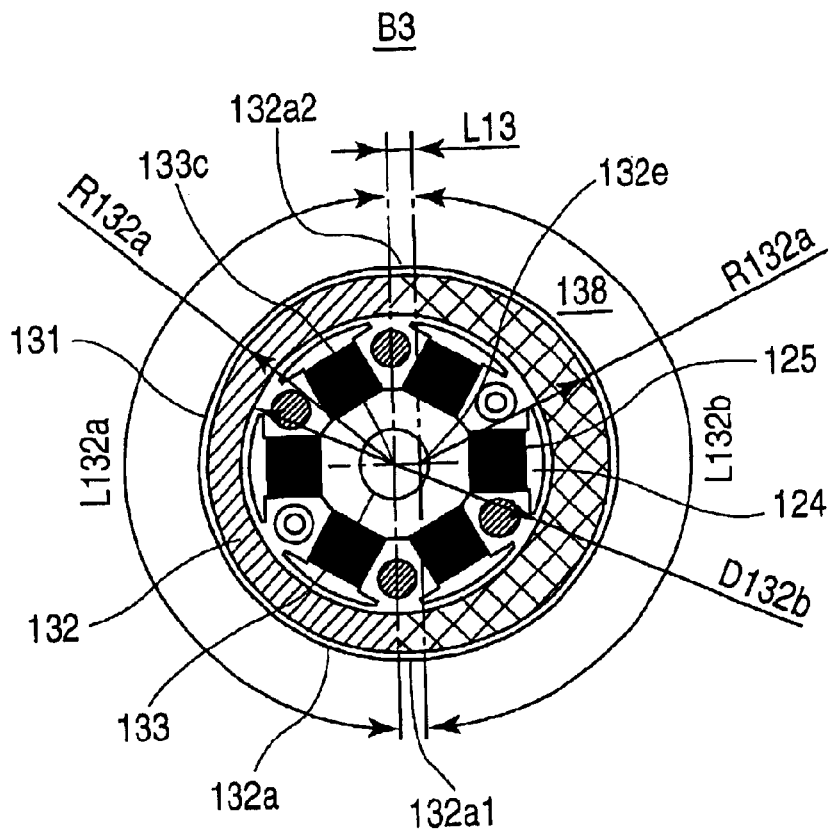
FIG. 19 is a fragmentary cross sectional view of a vibration type brushless motor according to a thirteenth embodiment of the present invention.

FIG. 19 is a fragmentary cross sectional view of a vibration type brushless motor according to the thirteenth embodiment of the present invention. In FIG. 19, a vibration type brushless motor B3 is composed of a rotor 138 and the same stator as the twelfth embodiment. The rotor 138 is further composed of a rotor yoke 131, a ring magnet 132 and a shaft 133. The ring magnet 132 in an ellipse shape has a circular inner hole of diameter D132$b$, which is arranged eccentric to a center of the ring magnet 132. The vibration type brushless motor B3 is a radial gap type brushless motor driven by three phases. Further, the ring magnet 132 is magnetized in eight magnetic poles along a whole circumference. Furthermore, the core 124 has six salient poles.

As shown in FIG. 19, the outer circumference of the ring magnet 132 is fixed to an inner wall of the rotor yoke 131 in a cup shape. The inner circumference of the ring magnet 132 is magnetized in eight magnetic poles with arranging the N and S magnetic poles alternately.

The core 124 having a plurality of salient poles, which protrude in the radial direction to the outer circumference, is fixed to the bearing member 126. Further, the coil 125 is wound around each of the plurality of salient poles. Supplying electric current to each coil 125 generates driving force for rotation. Accordingly, the rotor 138 rotates.

A center of the circular inner hole of the ring magnet 132 coincides with a center 133$c$ of rotation of the shaft 133 within a range of approximately 0 to 360 degrees in the mechanical angle. On the other hand, a center of an outer circumference of the ring magnet 132 coincides with the center of the circular inner hole of the ring magnet 132 or the center 133$c$ of rotation of the shaft 133 within an area L132$a$ allocated within a range of approximately 0 to 180 degrees in the mechanical angle. However, within a range of approximately 180 to 360 degrees, a center 132$e$ of the outer circumference of the ring magnet 132 within an area L132$b$ does not coincide with the center of the circular inner hole of the ring magnet 132. The center 132$e$ is shifted from the center 133$c$ of rotation of the shaft 133 by a shifting distance L13. In the ring magnet 132 having such the structure, gaps between the area L132$a$ within the range of approximately 0 to 180 degrees in the mechanical angle and the area L132$b$ within the range of approximately 180 to 360 degrees in the mechanical angle are connected smoothly by connecting sections 132$a$ and 132$b$.

In the ring magnet 132 having the above-mentioned structure, thickness of the ting magnet 132 in the area L132$a$ allocated within the range of approximately 0 to 180 degrees in the mechanical angle is thicker than that of the area L132$b$ allocated within the range of approximately 180 to 360 degrees in the mechanical angle. Thickness of the ring magnet 132 in the radial direction is uneven with respect to the whole circumference, partially thicker and partially thinner. Accordingly, the rotor 138 rotates in unbalance and can generate vibration.

Further, the center of the circular inner hole of the ring magnet 132 coincides with a center of the outer circumference formed by the plurality of salient poles. Therefore, a gap between the wall of the circular inner hole of the ring magnet 132 and a tip of each salient pole is always kept constant. Accordingly, a rotation accuracy of the vibration type brushless motor B3 is always kept excellent.

[Fourteenth Embodiment]

Figure 20:
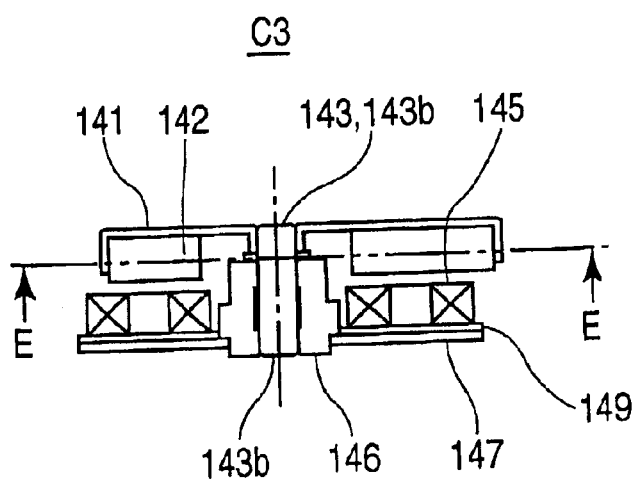
FIG. 20 is a cross sectional view of a vibration type brushless motor according to a fourteenth embodiment of the present invention.

FIG. 20 is a cross sectional view of a vibration type brushless motor according to a fourteenth embodiment of the present invention.

Figure 21:
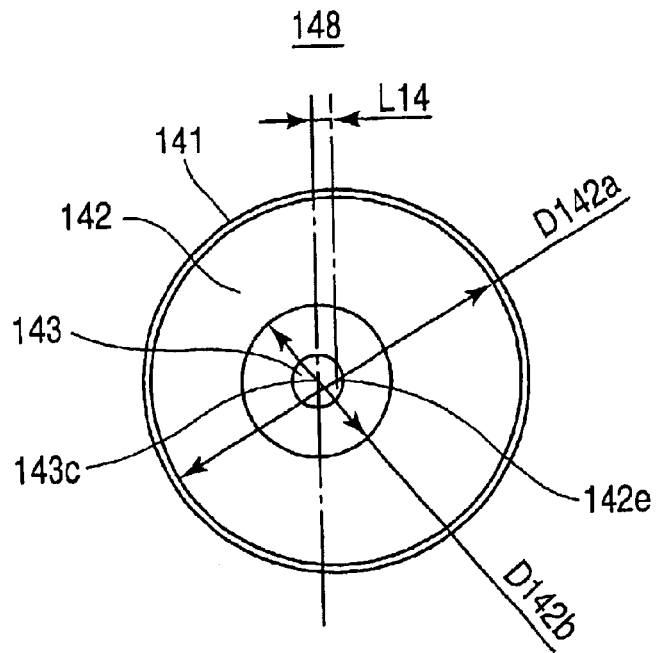
FIG. 21 is a fragmentary cross sectional view of a rotor of the vibration type brushless motor taken along line E—E in FIG. 20.

FIG. 21 is a fragmentary cross sectional view of a rotor of the vibration type brushless motor taken along line E—E in FIG. 20.

In FIGS. 20 and 21, a vibration type brushless motor C3 is composed of a rotor 148 and a stator. The rotor 148 is further composed of a rotor yoke 141, a ring magnet 142 and a shaft 143 having a top end 143$b$ and a bottom end 143$a$. The stator is composed of six air-core coils 145, a bearing member 146, a plate 147 and a printed circuit board 149. As shown in FIGS. 20 and 21, the ring magnet 142 of diameter D142$a$ has a circular inner hole of diameter D142$b$, which is arranged eccentric to a center of the ring magnet 142, and is fixed to the inside of the rotor yoke 141 in a cup shape. The top end 143$b$ of the shaft 143 is pressed into the rotor yoke 141 and the bottom end 143$a$ is held by the bearing member 146, which is a sintered bearing impregnated with oil, so as to rotate freely. The vibration type brushless motor C3 is a radial gap type brushless motor in a flat slotless structure driven by three phases. The ring magnet 142 is magnetized in eight magnetic poles with arranging the N and S magnetic poles alternately on the bottom surface. The printed circuit board 149 is laminated on the plate 147 and they are fixed to the bearing member 146 on the bottom. The six air-core coils 145 are fixed on the printed circuit board 149 in a ring shape at a same angle interval with centering the shaft 143. Further, the ring magnet 142 faces the six air-core coils 145 with keeping a gape between them in the thrust direction. By supplying electric current to the six air-core coils 145, rotation-driving force is generated. Consequently, the rotor 148 rotates.

As shown in FIG. 21, a center of the circular inner hole of diameter D142$b$ in the ring magnet 142 coincides with a center 143$c$ of rotation of the shaft 143. On the other hand, a center 142$e$ of the outer circumference of the ring magnet 142 does not coincide with the center of the circular inner hole or the center 143$c$ of rotation of the shaft 143. A shifting distance between the center 143$c$ of rotation and the center 142$e$ is L14. As mentioned above, a radius of the ring magnet 142 from the center 143$c$ of rotation is uneven along the outer circumference of the ring magnet 142. Therefore, the rotor 148 rotates in unbalance. Accordingly, vibration can be generated.

[Fifteenth Embodiment]

A vibration type brushless motor of a fifteenth embodiment is a radial gap type brushless motor in a flat slotless structure and similar to that of the fourteenth embodiment except for a rotor. Therefore, details of the same functions and configurations as the fourteenth embodiment are omitted in this embodiment.

Figure 22:
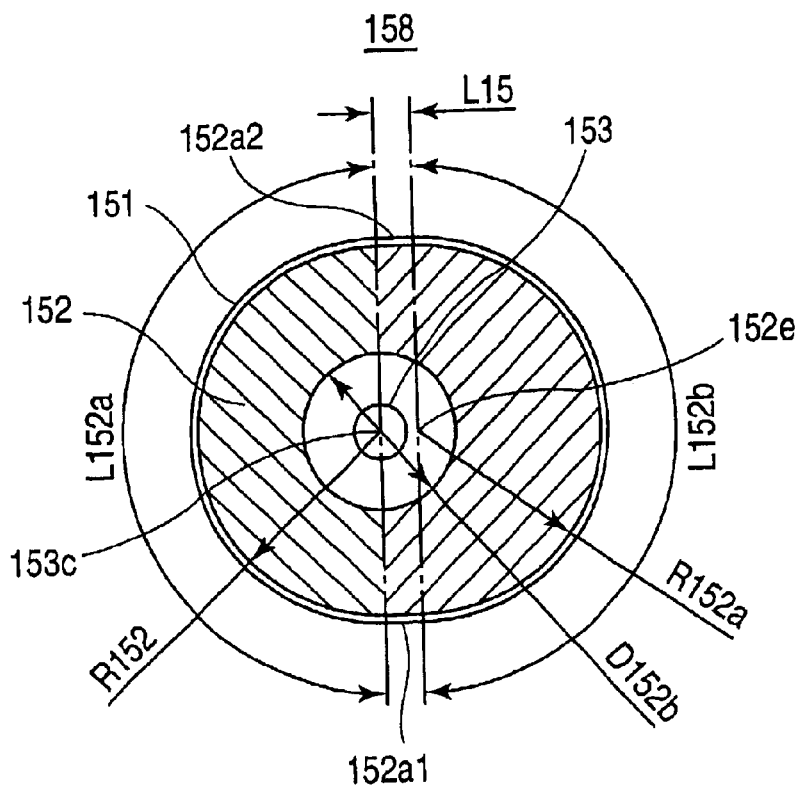
FIG. 22 is a fragmentary cross sectional view of a rotor of a vibration type brushless motor according to a fifteenth embodiment of the present invention.
Figure 23:
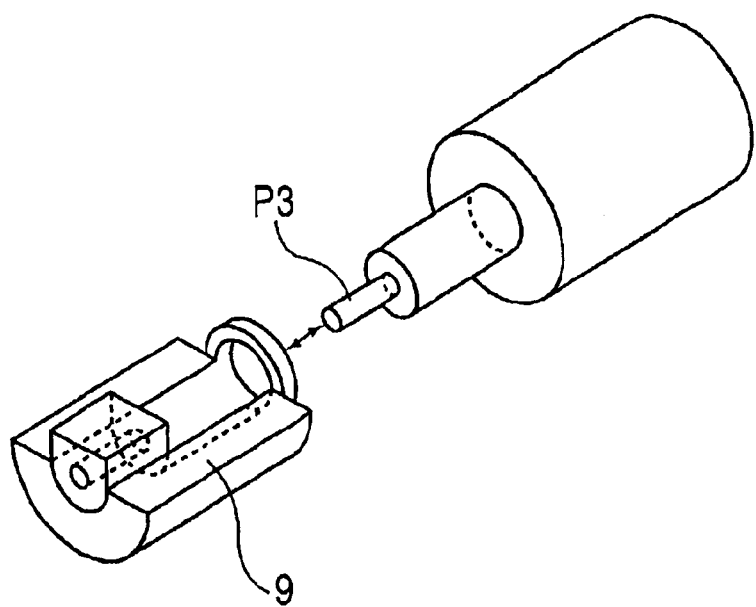
FIG. 23 is an exploded view of a vibration type motor of the prior art.
Figure 24:
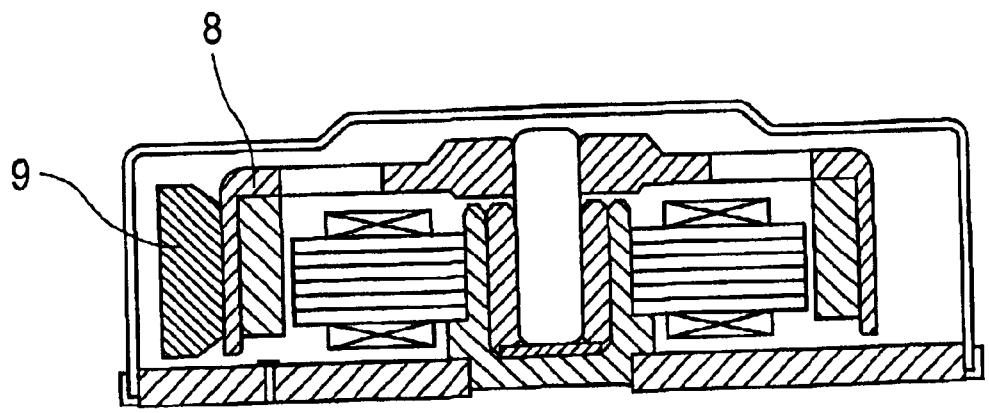
FIG. 24 is a cross sectional view of another vibration type motor of the prior art.
Figure 25:
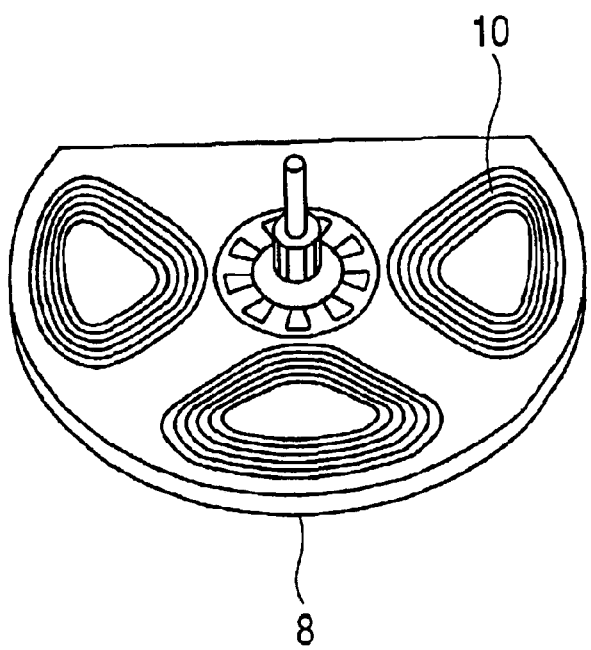
FIG. 25 is a perspective view of a rotor utilized for a vibration type motor of the prior art.
Figure 26:
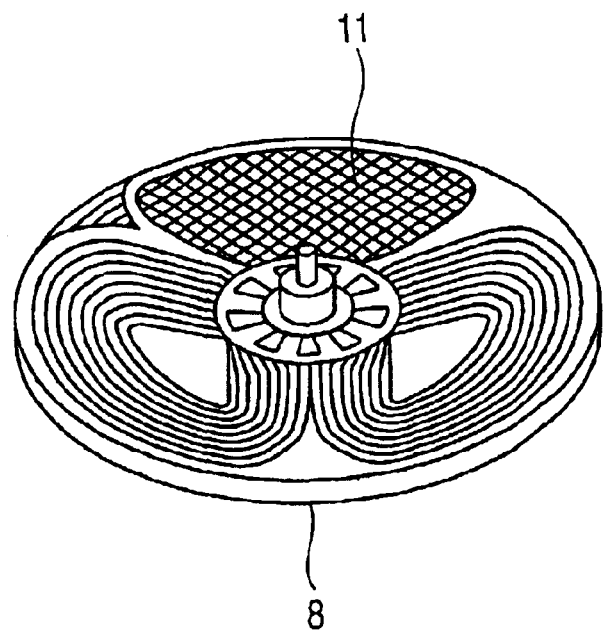
FIG. 26 is a perspective view of another type of rotor utilized for a vibration type motor of the prior art.

FIG. 22 is a fragmentary cross sectional view of a rotor of a vibration type brushless motor according to the fifteenth embodiment of the present invention.

In FIG. 22, a rotor 158 is composed of a rotor yoke 151, a ring magnet 152 and a shaft 153. The ring magnet 152 in an ellipse shape has a circular inner hole of diameter D152$b$, which is arranged eccentric to a center of the ring magnet 152. Further, the ring magnet 152 is magnetized in eight magnetic poles with arranging the N and S magnetic poles alternately on the bottom surface. Furthermore, the ring magnet 152 faces a plurality of air-core coils (not shown) mounted on a stator (not shown) with keeping a gape between them in the thrust direction. By supplying electric current to the plurality of air-core coils (not shown), rotation-driving force is generated. Consequently, the rotor 158 rotates.

A center of the circular inner hole of the ring magnet 152 coincides with a center 153c of rotation of the shaft 153 within a range of approximately 0 to 360 degrees in the mechanical angle. On the other hand, a center of an outer circumference of the ring magnet 152 coincides with the center of the circular inner hole of the ring magnet 152 or the center 153c of rotation of the shaft 153 within an area L152a allocated within a range of approximately 0 to 180 degrees in the mechanical angle. However, within a range of approximately 180 to 360 degrees, a center 152e of the outer circumference of the ring magnet 152 within an area L132b does not coincide with the center of the circular inner hole of the ring magnet 152. The center 152e is shifted from the center 153c of rotation of the shaft 153 by a shifting distance L15.

With respect to the ring magnet 152 having the above-mentioned structure, a radius of the ring magnet 152 from the center 152c of rotation of the shaft 153 in the area L152a allocated within the range of approximately 0 to 180 degrees in the mechanical angle is shorter than that in the area L152b allocated within the range of approximately 180 to 360 degrees in the mechanical angle. The radius of the ring magnet 152 from the center 153c of rotation in the radial direction is uneven with respect to the whole circumference, partially longer and partially shorter. Accordingly, the rotor 158 rotates in unbalance and can generate vibration.

Further, the center of the circular inner hole of the ring magnet 152 coincides with a center of an outer circumference formed by the plurality of air-core coils (not shown). Therefore, a gap between the circular inner hole of the ring magnet 152 and a surface of the plurality of air-core coils is always kept constant. Accordingly, a rotation accuracy of the vibration type brushless motor composed of the rotor 158 is always kept excellent.

As mentioned above, according to the first through eleventh embodiment of the present invention, any additional component necessary to generating vibration is not required. Therefore, cost or manpower will not be increased. Further, by designating some factors such as shapes of rotor yoke and magnet, a vibration effect or an amount of vibration can be arbitrary prescribed in accordance with necessity. Accordingly, the present invention can provide a vibration type brushless motor, which generates preferable vibration for various kinds of pagers and portable telephones as a vibration generating source.

Further, according to the twelfth through fifteenth embodiment, a center of an inner hole of a ring magnet coincides with a center of rotation of a rotor yoke and a center of an outer circumference of the ring magnet is shifted from the center of rotation of the rotor yoke. Vibration can be generated by unbalanced rotation of the rotor yoke fixed with the ring magnet, so that any additional component necessary to generating vibration is not required. Consequently, cost or manpower will not be increased. Furthermore, by altering the shifting distance arbitrary, a degree of vibration effect can be arbitrary prescribed. Moreover, the present invention can provide a vibration type brushless motor, which can be utilized effectively for a vibration generating source of a pager and a portable telephone requiring smaller dimensions, lightweight and saving energy more than ever.

What is claimed is:

1. A vibration type brushless motor in a structure of brushless motor having an outer rotor type core comprising:
   a rotor yoke;
   a shaft of which one end is held by a bearing member so as to rotate freely and another end is fixed to a center of rotation of the rotor yoke;
   a magnet in an arc; and
   a ring core arranged around the shaft,
   the rotor yoke having a side section being formed in a shape of which a part is cut off radially to the outer circumference direction from the center of rotation of the rotor yoke fixed with the other end of the shaft, wherein the ring magnet is fixed to the side section of the rotor yoke with facing the ring core,
   the vibration type brushless motor is further characterized in that vibration is generated by unbalanced vibration of the rotor yoke.

2. A vibration type brushless motor in a structure of brushless motor having an outer rotor type core comprising:
   a rotor yoke;
   a shaft of which one end is held by a bearing member so as to rotate freely and another end is fixed to a center of rotation of the rotor yoke;
   a magnet in an arc; and
   a ring core arranged around the shaft,
   the rotor yoke having a ceiling section formed in a disc shape with centering the center of rotation of the rotor yoke fixed with the other end of the shaft and a side section connecting with an outer circumference edge of the ceiling section, wherein a part of the side section is cut off in a circular arc, and wherein the ring magnet is fixed to the side section of the rotor yoke with facing the ring core,
   the vibration type brushless motor is further characterized in that vibration is generated by unbalanced vibration of the rotor yoke.

3. A vibration type brushless motor in a structure of brushless motor having an outer rotor type core comprising:
   a rotor yoke;
   a shaft of which one end is held by a bearing member so as to rotate freely and another end is fixed to a center of rotation of the rotor yoke;
   a magnet in an arc; and
   a ring core arranged around the shaft,
   the rotor yoke having a ceiling section formed in a disc shape with centering the center of rotation of the rotor yoke fixed with the other end of the shaft and a side section connecting with an outer circumference edge of the ceiling section, wherein a part of the ceiling section is cut off radially to an outer circumference direction from the center of rotation of the rotor yoke, and wherein the ring magnet is fixed to the side section of the rotor yoke with facing the ring core,
   the vibration type brushless motor is further characterized in that vibration is generated by unbalanced vibration of the rotor yoke.

4. The vibration type brushless motor in accordance with claim 1, wherein the magnet is magnetized in $2n$ magnetic poles with arranging the N and S magnetic poles alternately in one of a whole area and a part area of the magnet, where "n" is the positive integer.

5. The vibration type brushless motor in accordance with claim 2, wherein the magnet is magnetized in $2n$ magnetic poles with arranging the N and S magnetic poles alternately in one of a whole area and a part area of the magnet, where "n" is the positive integer.

6. The vibration type brushless motor in accordance with claim 3, wherein the magnet is magnetized in $2n$ magnetic poles with arranging the N and S magnetic poles alternately in one of a whole area and a part area of the magnet, where "n" is the positive integer.

* * * * *